United States Patent
Muszumanski et al.

[11] 3,937,562
[45] Feb. 10, 1976

[54] THREE-COMPONENT VARIFOCAL OBJECTIVE

[75] Inventors: Trude Muszumanski; Irmgard Wendisch, both of Vienna, Austria

[73] Assignees: Karl Vockenhuber; Raimund Hauser, both of Vienna, Austria

[22] Filed: Oct. 15, 1973

[21] Appl. No.: 406,291

[30] Foreign Application Priority Data
Oct. 16, 1972   Austria .............................. 8859/72

[52] U.S. Cl. ................................ 350/184; 350/219
[51] Int. Cl.² .................... G02B 15/00; G02B 9/60
[58] Field of Search ............ 350/184, 186, 216, 219

[56] References Cited
UNITED STATES PATENTS

| | | | |
|---|---|---|---|
| 3,477,776 | 11/1969 | Price | 350/184 |
| 3,575,495 | 4/1971 | Tibbetts | 350/219 |
| 3,615,125 | 10/1971 | Higuchi et al. | 350/184 |
| 3,784,283 | 1/1974 | Muszumanski et al. | 350/184 |

*Primary Examiner*—Alfred E. Smith
*Assistant Examiner*—Conrad Clark
*Attorney, Agent, or Firm*—Ernest G. Montague; Karl F. Ross; Herbert Dubno

[57] ABSTRACT

A varifocal objective has an axially shiftable positive front component, an axially shiftable negative intermediate component, and a fixed positive rear component or basic lens group. The latter component consists of five closely spaced lens members, all but the second of them singlets and all but the third of them positively refracting. The intermediate component is separated from the rear component by a diaphragm space which in a position of close approach of these components, corresponding to maximum focal length, is still substantially greater than any air space between the lens members of the rear component. With a varifocal ratio close to 3:1, the distance between the front and rear components is the same in the positions of maximum and minimum focal lengths.

16 Claims, 1 Drawing Figure

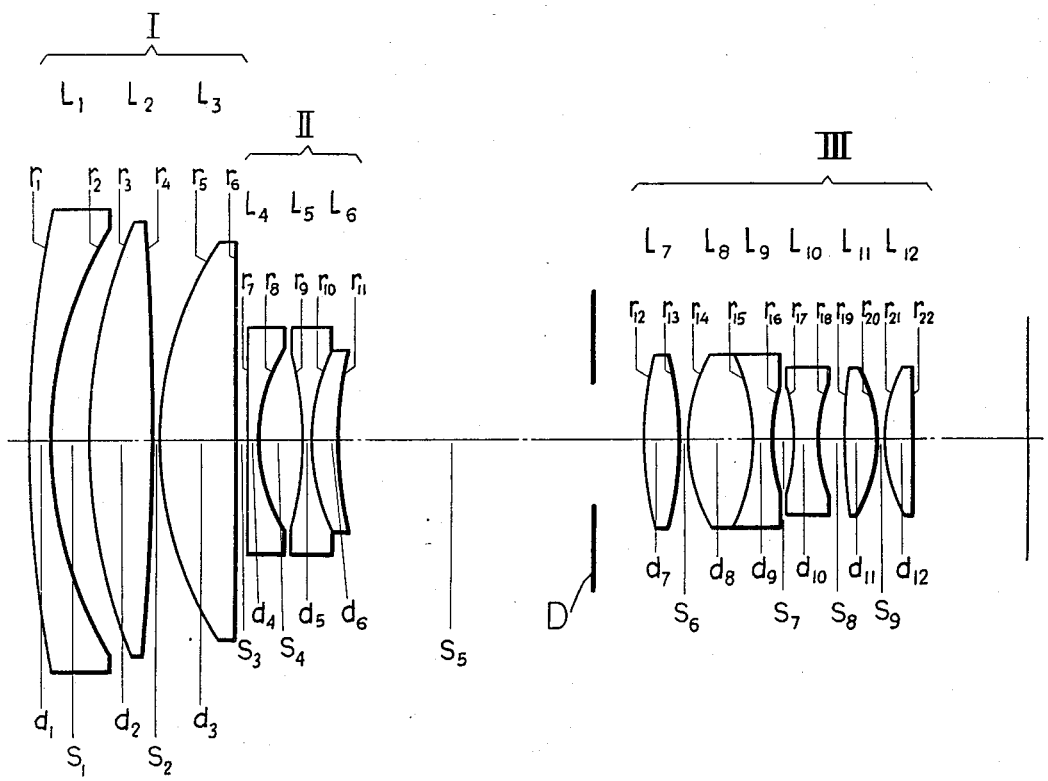

THREE-COMPONENT VARIFOCAL OBJECTIVE

FIELD OF THE INVENTION

Our present invention relates to an optical objective of the varifocal or zoom type, especially as used in motion-picture cameras such as those designed for the Super-8 film format.

BACKGROUND OF THE INVENTION

In commonly owned U.S. Pat. No. 3,784,283 there has been disclosed a zoom objective comprising an afocal forward lens unit with variable magnification and a main lens unit of fixed focal length, the two units being separated by an intervening diaphragm space. The forward lens unit consists of an axially shiftable front component (I) of positive refractivity, an axially shiftable intermediate component (II) of negative refractivity and an axially fixed positive component (III) in the form of a single lens. Within a zoom range having a varifocal ratio of about 3:1 between the miximum overall focal length $f_{max}$ and the minimum overall focal length $f_{min}$, the intermediate component is displaced between a limiting position near the front component at the upper end of the range ($f_{max}$) and another limiting position close to the fixed positive lens (III) at the lower end of the range ($f_{min}$), the distance of this movable component from the fixed positive lens of the forward unit in the latter position being considerably less than the length of the diaphragm space separating the fixed positive lens from the main lens unit (IV). At the limits of the zoom range, the distance of the front component (I) from the fixed positive lens (III) is the same.

OBJECT OF THE INVENTION

The object of our present invention is to provide a more compact varifocal objective of the general type disclosed in the above-identified patent with substantial preservation of the optical qualities of the objective described therein.

SUMMARY OF THE INVENTION.

A varifocal objective according to our present invention differs from that of the prior patent in that a fixed positive lens ($L_7$) is added as a fifth lens member to the four closely spaced lens members of the main lens unit or basic lens group of the prior system, with elimination of the fixed positive component of the forward lens unit ahead of the diaphragm space. Thus, the present objective consists of an axially shiftable positively refracting front component I, an axially shiftable negatively refracting intermediate component II, and an axially fixed positively refracting rear component III constituted by five closely air-spaced lens members, namely a positive first lens member ($L_7$), a positive second lens member ($L_8$, $L_9$), a negative third lens member ($L_{10}$), a positive fourth lens member ($L_{11}$) and a positive fifth lens member ($L_{12}$), the spacing of the intermediate component from the rear component in its position of maximum overal focal length ($f_{max}$) substantially exceeding any air space between the lens members of the rear component. This allows a diaphragm to be accommodated in the space between the movable intermediate component II and the fixed rear component III, with reduction of the forward lens group to two independently shiftable components.

BRIEF DESCRIPTION OF THE DRAWING

The above and other fearures of our invention will now be described in detail with reference to the accompanying drawing the sole FIGURE of which illustrates, schematically, a three-component varifocal objective embodying the invention.

SPECIFIC DESCRIPTION

The varifocal or zoom objective shown in the drawing consists of a positively refracting front component I, a negatively refracting intermediate component II and a positively refracting rear component III, components I and II being axially shiftable whereas component III is fixed. A diaphragm D is interposed between components II and III.

Front component I consists of three lenses $L_1$, $L_2$, $L_3$ separated by air spaces $s_1$ and $s_2$. Lens $L_1$ is a forwardly convex negative meniscus whereas lenses $L_2$ and $L_3$ are biconvex; the latter lens, however, may be described as substantially planoconvex since its rear surface is almost flat as will be apparent from the numerical values given below. Component II, separated by a variable air space $s_3$ from component I, consists of a substantially planoconcave lens $L_4$ with rearwardly facing concavity and a compound member, separated from lens $L_4$ by an air space $s_4$, which is composed of a biconcave lens $L_5$ cemented onto a positive meniscus $L_6$. The first lens member of rear component III, closest to the diaphragm space $s_5$, is a biconvex lens $L_7$ and is separated by a small air space $s_6$ from a compound member consisting of a biconvex lens $L_8$ cemented onto a biconcave lens $L_9$; a biconcave lens $L_{10}$, constituting the only negative lens member of the rear component III, is separated by air spaces $s$ and $s_8$ from lens $L_9$ and from an adjoining biconvex lens $L_{11}$, followed after another air space $s_9$ by the fifth and last lens member in the form of a substantially planconvex lens $L_{12}$ with forwardly facing convexity.

In the following Table 1 we have given representative numerical values for the radii of curvature $r_1-r_{22}$, the axial thicknesses $d_1-d_{12}$ and the axial separations $s_1-s_9$ of lenses $L_1-L_{12}$, based upon a value of unity (e.g. 1 mm) for an intermediate focal length $f_{med}$ of the varifocal objective, along with their refractive indices $n_d$ and their Abbe numbers $\nu_d$. This objective has a relative aperture of 1:1.2 and an image diagonal of 0.54; its overall focal length at the limits of the zoom range is $f_{min} = 0.594$ and $f_{max} = 1.683$.

TABLE 1

| Lenses | Radii | Thicknesses and Separations | $n_d$ | $\nu_d$ |
|---|---|---|---|---|
| | $r_1 = +8.706$ | | | |
| $L_1$ | | $d_1 = 0.15$ | 1.805 | 25.4 |
| | $r_2 = +2.628$ | | | |
| | | $s_1 = 0.21$ | | |
| | $r_3 = +3.408$ | | | |
| $L_2$ | | $d_2 = 0.43$ | 1.603 | 60.6 |
| | $r_4 = -18.304$ | | | |

TABLE 1-continued

| Lenses | Radii | Thicknesses and Separations | $\eta_d$ | $\nu_d$ |
|---|---|---|---|---|
| | | $s_2 = 0.01$ | | |
| $L_3$ | $r_5 = +2.278$ | $d_3 = 0.52$ | 1.658 | 50.9 |
| | $r_6 = -130.310$ | | | |
| | | $s_3 = \begin{cases} 0.05 & [f_{min}] \\ 0.78 & [f_{med}] \\ 1.21 & [f_{max}] \end{cases}$ | | |
| $L_4$ | $r_7 = +40.501$ | $d_4 = 0.08$ | 1.713 | 53.8 |
| | $r_8 = +0.999$ | | | |
| | | $s_4 = 0.24$ | | |
| $L_5$ | $r_9 = -3.780$ | $d_5 = 0.08$ | 1.641 | 60.1 |
| | $r_{10} = +1.170$ | | | |
| $L_6$ | $r_{11} = +4.173$ | $d_6 = 0.21$ | 1.847 | 23.8 |
| | | $s_5 = \begin{cases} 2.06 & [f_{min}] \\ 1.63 & [f_{med}] \\ 0.90 & [f_{max}] \end{cases}$ | | |
| $L_7$ | $r_{12} = +2.794$ | $d_7 = 0.21$ | 1.717 | 48.0 |
| | $r_{13} = -3.655$ | | | |
| | | $s_6 = 0.01$ | | |
| $L_8$ | $r_{14} = +0.955$ | $d_8 = 0.42$ | 1.657 | 36.7 |
| | $r_{15} = -1.513$ | | | |
| $L_9$ | $r_{16} = +2.066$ | $d_9 = 0.17$ | 1.805 | 25.4 |
| | | $s_7 = 0.08$ | | |
| $L_{10}$ | $r_{17} = -2.166$ | $d_{10} = 0.19$ | 1.847 | 23.8 |
| | $r_{18} = +1.030$ | | | |
| | | $s_8 = 0.15$ | | |
| $L_{11}$ | $r_{19} = +5.136$ | $d_{11} = 0.23$ | 1.713 | 53.8 |
| | $r_{20} = -1.036$ | | | |
| | | $s_9 = 0.01$ | | |
| $L_{12}$ | $r_{21} = +0.946$ | $d_{12} = 0.23$ | 1.641 | 60.1 |
| | $r_{22} = -380.504$ | | | |

From the foregoing values the individual focal lengths of lens members $L_7$, $L_8+L_9$, $L_{10}$, $L_{11}$ and $L_{12}$ of rear component III, whose focal length equals 1.23, can be calculated as follows:

$f_7 = +2.24$
$f_{8,9} = +3.25$
$f_{10} = -0.80$
$f_{11} = +1.23$
$f_{12} = +1.47$

From Table 1 it will also be noted that the sum $s_3 + s_5$ has the same value in the limiting positions of $f_{min}$ and $f_{max}$, which means that the separation between components I and III in these limiting positions is the same.

The calculation further shows that the focal lengths $f_I$ and $f_{II}$ of the axially shiftable components are +3.20 and −1.06, respectively.

Table 2 shows an alternate set of parameters for the fixed lenses $L_7$–$L_{12}$. In this instance, the component III has the focal length $f_{III} = 1.17$.

TABLE 2

| Lenses | Radii | Thicknesses and Separations | $\eta_d$ | $\nu_d$ |
|---|---|---|---|---|
| $L_7$ | $r_{12} = +2.794$ | $d_7 = 0.21$ | 1.717 | 48.0 |
| | $r_{13} = -3.655$ | | | |
| | | $s_6 = 0.01$ | | |
| $L_8$ | $r_{14} = +0.955$ | $d_8 = 0.42$ | 1.657 | 36.7 |
| | $r_{15} = -1.513$ | | | |
| $L_9$ | $r_{16} = +3.800$ | $d_9 = 0.04$ | 1.805 | 25.4 |
| | | $s_7 = 0.08$ | | |
| $L_{10}$ | $r_{17} = -2.166$ | $d_{10} = 0.19$ | 1.847 | 23.8 |
| | $r_{18} = +1.030$ | | | |
| | | $s_8 = 0.15$ | | |
| $L_{11}$ | $r_{19} = +5.136$ | $d_{11} = 0.23$ | 1.713 | 53.8 |
| | $r_{20} = -1.036$ | | | |

TABLE 2-continued

| Lenses | Radii | Thicknesses and Separations | $\eta_d$ | $\nu_d$ |
|---|---|---|---|---|
| | | $s_9 = 0.01$ | | |
| $L_{12}$ | $r_{21} = +1.153$ | $d_{12} = 0.23$ | 1.641 | 60.1 |
| | $r_{22} = +42.916$ | | | |

The individual focal lengths of the fixed lens members calculated from the numerical values of this second Example are as follows:

$f_7 = +2.24$
$f_{8,9} = +2.30$
$f_{10} = +0.80$
$f_{11} = +1.23$
$f_{12} = +1.85$

A third example for a rear component forming part of a varifocal objective according to our invention, with $f_{III} = 1.48$, is as follows:

TABLE 3

| Lenses | Radii | Thicknesses and Separations | $\eta_d$ | $\nu_d$ |
|---|---|---|---|---|
| $L_7$ | $r_{12} = +4.180$ | $d_7 = 0.21$ | 1.717 | 48.0 |
| | $r_{13} = -3.655$ | | | |
| | | $s_6 = 0.01$ | | |
| $L_8$ | $r_{14} = +0.955$ | $d_8 = 0.42$ | 1.657 | 36.7 |
| | $r_{15} = -1.513$ | | | |
| $L_9$ | $r_{16} = +2.066$ | $d_9 = 0.17$ | 1.805 | 25.4 |
| | | $s_7 = 0.08$ | | |
| $L_{10}$ | $r_{17} = -2.166$ | $d_{10} = 0.76$ | 1.847 | 23.8 |
| | $r_{18} = +1.064$ | | | |
| | | $s_8 = 0.15$ | | |
| $L_{11}$ | $r_{19} = +5.136$ | $d_{11} = 0.23$ | 1.713 | 53.8 |

TABLE 3-continued

| Lenses | Radii | Thicknesses and Separations | $n_d$ | $\nu_d$ |
|---|---|---|---|---|
| | $r_{20} = -1.036$ | | | |
| | | $s_9 = 0.01$ | | |
| | $r_{21} = +0.922$ | | | |
| $L_{12}$ | | $d_{12} = 0.23$ | 1.658 | 57.3 |
| | $r_{22} = -12.883$ | | | |

Calculations based on these latter parameters show the individual focal lengths of the lens members of component III to have the following values:

$f_7 = +2.75$
$f_{8,9} = +3.25$
$f_{10} = -0.76$
$f_{11} = +1.23$
$f_{12} = +1.32$

From the foregoing examples it will also be seen that the refractive indices of all positive lenses ($L_7$, $L_8$, $L_{11}$ and $L_{12}$) of component III are less than 1.72 and that the shortest radius of curvature of any lens in that component, specifically radius $r_{21}$ in Table 3, is greater than $0.6f_{III}$.

What is claimed is:

1. A varifocal objective consisting of:
an axially shiftable positively refracting front component;
an axially shiftable negative refracting intermediate component; and
an axially fixed positively refracting rear component constituted by five closely air-spaced lens members, namely a positive first lens member, a positive second lens member, a negative third lens member, a positive fourth lens member and a positive fifth lens member, the spacing of said intermediate component from said rear component in a position of maximum overall focal length substantially exceeding any air space between said lens members while being substantially smaller than in a position of minimum overall focal length, said front component consisting of a forwardly convex negative meniscus $L_1$ followed by a biconvex lens $L_2$ and a substantially planoconvex lens $L_3$ with forwardly facing convexity, said second component consisting of a substantially planoconcave lens $L_4$ rearwardly facing concavity followed by a biconcave lens $L_5$ cemented onto a positive meniscus $L_6$, said first lens member of said rear component being a biconvex lens $L_7$, said second lens member consisting of a biconvex lens $L_8$ cemented to a biconcave lens $L_9$, said third lens member being a biconcave lens $L_{10}$, said fourth lens member being a biconvex lens $L_{11}$, and said fifth member being a substantially planoconvex lens $L_{12}$ with forwardly facing convexity.

2. A varifocal objective as defined in claim 1, further comprising diaphragm means in the space between said intermediate and rear components.

3. A varifocal objective as defined in claim 1 wherein the separation between said front and rear components is substantially the same in said position of maximum overall focal length and in said position of minimum overall focal length.

4. A varifocal objective as defined in claim 3 wherein the ratio of said maximum and minimum overall focal lengths is close to 3:1.

5. A varifocal objective as defined in claim 1 wherein said lenses $L_7$, $L_8$, $L_{11}$ and $L_{12}$ have refractive indices less than 1.72.

6. A varifocal objective as defined in claim 1 wherein said first component has a focal length of +3.20 and said second component has a focal length of −1.06.

7. A varifocal objective as defined in claim 6 wherein the separation of said front component from said rear component is substantially the same in said positions of maximum overall focal length $f_{max}$ and of minimum overall focal length $f_{min}$ and is larger in a position of intermediate overall focal length $f_{med}$.

8. A varifocal objective as defined in claim 7 wherein the numerical values of the radii of curvature $r_1-r_{11}$, the axial thicknesses $d_1-d_6$ and the axial separations $s_1-s_4$ of said lenses $L_1-L_6$, based upon said value of unity for said intermediate overall focal length $f_{med}$, their refractive indices $n_d$ and their Abbé numbers $\nu_d$ are substantially as given in the following table:

| Lenses | Radii | Thicknesses and Separations | $n_d$ | $\nu_d$ |
|---|---|---|---|---|
| $L_1$ | $r_1 = +8.706$ | $d_1 = 0.15$ | 1.805 | 25.4 |
| | $r_2 = +2.628$ | $s_1 = 0.21$ | | |
| $L_2$ | $r_3 = +3.408$ | $d_2 = 0.43$ | 1.603 | 60.6 |
| | $r_4 = -18.304$ | $s_2 = 0.01$ | | |
| $L_3$ | $r_5 = +2.278$ | $d_3 = 0.52$ | 1.658 | 50.9 |
| | $r_6 = -130.310$ | $s_3 = \begin{cases} 0.05 & [f_{min}] \\ 0.78 & [f_{med}] \\ 1.21 & [f_{max}] \end{cases}$ | | |
| $L_4$ | $r_7 = +40.501$ | $d_4 = 0.08$ | 1.713 | 53.8 |
| | $r_8 = +0.999$ | $s_4 = 0.24$ | | |
| $L_5$ | $r_9 = -3.780$ | $d_5 = 0.08$ | 1.641 | 60.1 |
| | $r_{10} = +1.170$ | | | |
| $L_6$ | | $d_6 = 0.21$ | 1.847 | 23.8 |
| | $r_{11} = +4.173$ | | | |

9. A varifocal objective as defined in claim 8 wherein the numerical values of the axial separation $s_5$ of said intermediate and rear components, the radii $r_{12}-r_{22}$ of said lenses $L_7-L_{12}$, the axial thicknesses $d_7-d_{12}$ and axial separations $s_6-s_9$ thereof, their refractive indices $n_d$ and their Abbé numbers $\nu_d$ are substantially as given in the following table:

| Lenses | Radii | Thicknesses and Separations | $n_d$ | $\nu_d$ |
|---|---|---|---|---|
| | | $s_5 = \begin{cases} 2.06 & [f_{min}] \\ 1.63 & [f_{med}] \\ 0.90 & [f_{max}] \end{cases}$ | | |
| $L_7$ | $r_{12} = +2.794$ | $d_7 = 0.21$ | 1.717 | 48.0 |
| | $r_{13} = -3.655$ | $s_6 = 0.01$ | | |
| $L_8$ | $r_{14} = +0.955$ | $d_8 = 0.42$ | 1.637 | 36.7 |
| | $r_{15} = -1.513$ | | | |
| $L_9$ | | $d_9 = 0.17$ | 1.805 | 25.4 |
| | $r_{16} = +2.006$ | $s_7 = 0.08$ | | |
| $L_{10}$ | $r_{17} = -2.166$ | $d_{10} = 0.19$ | 1.847 | 23.8 |
| | $r_{18} = +1.030$ | $s_8 = 0.15$ | | |
| $L_{11}$ | $r_{19} = +5.136$ | $d_{11} = 0.23$ | 1.713 | 53.8 |
| | $r_{20} = -1.036$ | $s_9 = 0.01$ | | |
| $L_{12}$ | $r_{21} = +0.946$ | $d_{12} = 0.23$ | 1.641 | 60.1 |
| | $r_{22} = -380.540$ | | | |

10. A varifocal objective as defined in claim 2 wherein said first, second, third, fourth and fifth lens members have individual focal lengths substantially equal to +2.24, +3.25, −0.80, +1.23 and 1.47, respectively.

11. A varifocal objective as defined in claim 10 wherein the numerical values of the radii of curvature $r_{12}$–$r_{22}$, the axial thicknesses $d_7$–$d_{12}$ and the axial separations $s_6$–$s_9$ of said lenses $L_7$–$L_{12}$, based upon said value of unity for said intermediate overall focal length $f_{med}$, their refractive indices $n_d$ and their Abbe numbers $\nu_d$ are substantially as given in the following table:

| Lenses | Radii | Thicknesses and Separations | $n_d$ | $\nu_d$ |
|---|---|---|---|---|
| $L_7$ | $r_{12} = +2.794$ | $d_7 = 0.21$ | 1.717 | 48.0 |
| | $r_{13} = -3.655$ | $s_6 = 0.01$ | | |
| $L_8$ | $r_{14} = +0.955$ | $d_8 = 0.42$ | 1.657 | 36.7 |
| | $r_{15} = -1.513$ | | | |
| $L_9$ | $r_{16} = +2.066$ | $d_9 = 0.17$ | 1.805 | 25.4 |
| | | $s_7 = 0.08$ | | |
| $L_{10}$ | $r_{17} = -2.166$ | $d_{10} = 0.19$ | 1.847 | 23.8 |
| | $r_{18} = +1.030$ | $s_8 = 0.15$ | | |
| $L_{11}$ | $r_{19} = +5.136$ | $d_{11} = 0.23$ | 1.713 | 53.8 |
| | $r_{20} = -1.036$ | $s_9 = 0.01$ | | |
| $L_{12}$ | $r_{21} = +0.946$ | $d_{12} = 0.23$ | 1.641 | 60.1 |
| | $r_{22} = -380.504$ | | | |

12. A varifocal objective as defined in claim 1 wherein said first, second, third, fourth and fifth lens members have individual focal lengths substantially equal to + 2.24, + 2.30, + 0.80, + 1.23 and + 1.85, respectively.

13. A varifocal objective as defined in claim 12 wherein the numerical values of the radii of curvature $r_{12}$–$r_{22}$, the axial thicknesses $d_7$–$d_{12}$ and the axial separations $s_6$–$s_9$ of said lenses $L_7$–$L_{12}$, based upon said value of unity for said intermediate overall focal length $f_{med}$, their refractive indices $n_d$ and their Abbe numbers $\nu_d$ are substantially as given in the following table:

| Lenses | Radii | Thicknesses and Separations | $n_d$ | $\nu_d$ |
|---|---|---|---|---|
| $L_7$ | $r_{12} = +2.794$ | $d_7 = 0.21$ | 1.717 | 48.0 |
| | $r_{13} = -3.655$ | $s_6 = 0.01$ | | |
| $L_8$ | $r_{14} = +0.955$ | $d_8 = 0.42$ | 1.657 | 36.7 |
| | $r_{15} = -1.513$ | | | |
| $L_9$ | $r_{16} = +3.800$ | $d_9 = 0.04$ | 1.805 | 25.4 |
| | | $s_7 = 0.08$ | | |
| $L_{10}$ | $r_{17} = -2.166$ | $d_{10} = 0.19$ | 1.847 | 23.8 |
| | $r_{18} = +1.030$ | $s_8 = 0.15$ | | |
| $L_{11}$ | $r_{19} = +5.136$ | $d_{11} = 0.23$ | 1.713 | 53.8 |
| | $r_{20} = -1.036$ | $s_9 = 0.01$ | | |
| $L_{12}$ | $r_{21} = +1.153$ | $d_{12} = 0.23$ | 1.641 | 60.1 |
| | $r_{22} = +42.916$ | | | |

14. A varifocal objective as defined in claim 1 wherein said first, second, third, fourth and fifth lens members have individual focal lengths substantially equal to +2.75, +3.25, −0.76, +1.23 and +1.32, respectively.

15. A varifocal objective as defined in claim 14 wherein the numerical values of the radii of curvature $r_{12}$–$r_{22}$, the axial thicknesses $d_7$–$d_{12}$ and the axial separations $s_6$–$s_9$ of said lenses $L_7$–$L_{12}$, based upon said value of unity for said intermediate overall focal length $f_{med}$, their refractive indices $n_d$ and their Abbe numbers $\nu_d$ are substantially as given in the following table:

| Lenses | Radii | Thicknesses and Separations | $n_d$ | $\nu_d$ |
|---|---|---|---|---|
| $L_7$ | $r_{12} = +4.180$ | $d_7 = 0.21$ | 1.717 | 48.0 |
| | $r_{13} = -3.655$ | $s_6 = 0.01$ | | |
| $L_8$ | $r_{14} = +0.955$ | $d_8 = 0.42$ | 1.657 | 36.7 |
| | $r_{15} = -1.513$ | | | |
| $L_9$ | $r_{16} = +2.066$ | $d_9 = 0.17$ | 1.805 | 25.4 |
| | | $s_7 = 0.08$ | | |
| $L_{10}$ | $r_{17} = -2.166$ | $d_{10} = 0.76$ | 1.847 | 23.8 |
| | $r_{18} = +1.064$ | $s_8 = 0.15$ | | |
| $L_{11}$ | $r_{19} = +5.136$ | $d_{11} = 0.23$ | 1.713 | 53.8 |
| | $r_{20} = -1.036$ | $s_9 = 0.01$ | | |
| $L_{12}$ | $r_{21} = +0.922$ | $d_{12} = 0.23$ | 1.658 | 57.3 |
| | $r_{22} = -12.833$ | | | |

16. A varifocal objective as defined in claim 1 wherein the individual focal lengths $f_7, f_{8,9}, f_{10}, f_{11}$ and $f_{12}$ of said first, second, third, fourth and fifth members bear the relationship $f_{8,9} > f_7 > f_{12} > f_{11} > |f_{10}|$.

* * * * *